(12) United States Patent
Johnson et al.

(10) Patent No.: US 6,362,823 B1
(45) Date of Patent: Mar. 26, 2002

(54) INTELLECTUAL STRUCTURE FOR SINGLE-POINT VISUAL REPRESENTATION OF N-DIMENSIONAL POINTS USING BROKEN-LINE PARALLEL COORDINATES

(75) Inventors: Robert R. Johnson, Salt Lake City; Marc Palmer, West Valley City; Eric Palmer, West Jordan; Rodney D. Millar, Salt Lake City, all of UT (US)

(73) Assignee: N-Dimensional Visualization, Salt Lake City, UT (US)

( * ) Notice: Subject to any disclaimer, the term of this patent is extended or adjusted under 35 U.S.C. 154(b) by 0 days.

(21) Appl. No.: 09/344,600

(22) Filed: Jun. 25, 1999

Related U.S. Application Data (63) Continuation-in-part of application No. 09/002,617, filed on Jan. 5, 1998, now Pat. No. 5,917,500.
(51) Int. Cl.[7] .................................................. G06T 11/20
(52) U.S. Cl. ........................ 345/440; 345/419; 345/421; 345/441
(58) Field of Search ................................ 345/440, 441, 345/88, 443, 442, 473, 474, 475, 428, 581, 964, 421, 419, 619, 625, 649, 652, 653

(56) References Cited

U.S. PATENT DOCUMENTS

| | | | | |
|---|---|---|---|---|
| 5,457,775 A | * | 10/1995 | Johnson, Jr. et al. | ........ 345/441 |
| 5,821,913 A | * | 10/1998 | Mamiya | ...................... 345/88 |
| 5,917,500 A | * | 6/1999 | Johnson et al. | ............. 345/440 |

* cited by examiner

Primary Examiner—Matthew Luu
Assistant Examiner—Thu-Thao Havan
(74) Attorney, Agent, or Firm—Morriss, Bateman, O'Bryant & Compagni (57) ABSTRACT

A method for utilizing an intellectual structure for visualizing a system of multi-variate data points in a parallel coordinate system, identifying an area of interest within the system, and then transforming a selected portion of the system for visualization in single-point representations of n-dimensional points using broken-line parallel coordinates, where the n point representations of conventional parallel coordinates are brought back into a single point representation that is the single point vector resultant of n dimensional spaces viewable in familiar three dimensional display space.

18 Claims, 10 Drawing Sheets

INTELLECTUAL STRUCTURE FOR SINGLE-POINT VISUAL REPRESENTATION OF N-DIMENSIONAL POINTS USING BROKEN-LINE PARALLEL COORDINATES

HISTORY

The present application is a continuation-in-part of allowed U.S. Pat. Ser. No. 5,917,500, filed on Jan. 5, 1998, and issuing on Jun. 29, 1999. The subject matter of the U.S. Patent is incorporated herein by reference.

BACKGROUND

1. The Field of the Invention

This invention relates generally to the organization and understanding of data generated in multi-dimensional space. More specifically, a data system of multi-dimensional data points is visualized in a parallel coordinate system. An area of interest is then identified, and the n point representations of conventional parallel coordinates are brought back into a single point representation that is the single point vector resultant of n dimensional spaces viewable in familiar three dimensional display space.

2. The State of the Art

Problem solving in multi-dimensional (or multi-variate) space is an increasingly important field of research. This is particularly true because data sets (systems) are becoming increasingly complex and large. The number of systems that require analysis is growing faster than the existing systems can be analyzed. Furthermore, the existing tools are proving to be inadequate for the large systems.

Statistical methods are the classical means used to derive meaning from data defined systems. Such methods typically apply their analyses to whole regions of data. For example, conventional software analysis tools combine statistical analysis methods in conjunction with conventional visualization techniques. A second class of methods are known as data mining. A typical product employing such techniques is SGI's Mine Set product line.

Visualization of data can at least enable identification of a domain of relevance to which statistical analyses should be directed. These visualization techniques include the method developed by A. Inselberg, Parallel Coordinates, A Tool for Visualizing Multi-variate Relations. A. Klinger, in Human Machine Interactive Systems which exemplifies the use of one approach to visualization of multi-dimensional spaces. Another is the work of nDimensional Visualization (the nDV method) which is explained in the parent case. These visualization techniques may reveal other relationships that conventional statistical tools might miss. The visualizations may also identify possible rotations and rejuxtapositions of coordinates that can be relevant to developing new understandings of relationships. A helpful summary of the state of the art in visualization can be found in the recently published book *Readings in Information Visualization: Using Vision to Think*, by S. Card, J. Mackinlay and B. Shneiderman.

It is also known in the art to map from parallel or concurrent multi-dimensional spaces back into classical orthogonal three dimensional space in order to display the effect of the selected three dimensions upon each other. However, those using this method do not teach, suggest, or otherwise contemplate displaying data in anything other than classical orthogonal three dimensional (or two dimensional) relationships.

Insight to data-defined relationships is provided by nDimensional Visualizations's technique (the nDV method) for viewing data within a parallel coordinate system. This unique directrix-based-geometry maps classical familiar geometric shapes in orthogonal space into the corresponding shapes in parallel coordinates. The nDV method provides the basic understanding of what to look for while examining data models in their parallel coordinate data spaces. These new understandings of the geometry of parallel coordinates reveal possible curve-fitable waveforms that can now be more readily recognized, but which have not been previously considered for curve fittings because they could not be seen in classical parallel coordinate mapping.

Classical geometries that are mapped using the original generatrix mapping of the nDV method include straight lines, intersecting straight lines, circles, squares, polygons, cylinders, cones, spheres, cubes, and polyhedra. These classic shapes are mapped from familiar two dimensional and three dimensional shapes into parallel coordinate models using line-generatrices. Line-generatrices are important because these are the shapes typically encountered in data-defined space models. Knowledge about the meanings of the line structures encountered in parallel coordinate data defined spaces is vital when synthesizing the cumulative effect or meaning of those structures.

Most prominent of these new waveforms are those generated as products of sin/cos functions. For example, Fourier analyses typically look only for the sums of sin/cos functions. Such sin/cos product functions can be decomposed by classic trigonometric identities into the sum and difference frequencies represented by these product functions. Knowledge of the meaning of sum and difference frequencies allows usage of these trigonometric identities to reveal the spherical relationships between those coordinates that could not be otherwise recognized.

It was a concept of the parent case that animated data space models using the nDV method are the basis for being able to see, recognize for their significance, and then use structures and relationships within the data. What is now needed is a new method of deriving more information about, or identifying new relationships within, the data space models created using the nDV method.

It would be an advantage over the prior art to be able to select any number of coordinates that are observed in the parallel coordinates generated by using the nDV method, and map them back into three dimensional orthogonal (but not necessarily 90 degree orthogonal) space.

It would be another advantage to apply curve-fitable waveforms to these transformed coordinates to thereby identify portions of the data that is mapped in parallel coordinate space which correspond to recognizable waveforms.

OBJECTS AND SUMMARY OF THE INVENTION

It is an object of the present invention to provide a method for transforming multi-variate data shown in a parallel coordinate system to Single-point representations of n-dimensional points using Broken-line Parallel coordinates (or SBP space).

It is another object to transform multi-variate data shown in SBP space to a parallel coordinate system.

It is another object to facilitate recognition of structure, patterns and trends within data plotted in parallel coordinate space or SBP space.

It is another object to facilitate identification of structures or relationships generated along, across and among the coordinates of multi-dimensional data.

It is another object to facilitate quantification of these relationships.

It is another object to facilitate understanding of how these structures are descriptive of relationships among or between the variables within a system.

It is another object to facilitate learning the behavior of a system through observation of the data in SBP space.

It is another object to facilitate the understanding of multi-variate data from observation in SBP space such that further experiments using the system can be implemented to thereby obtain more useful data.

It is another object to facilitate the understanding of multi-variate data from observation of the data in SBP space such that further observations of other portions of the multi-variate data can be selected based on a previous observation.

The presently preferred embodiment of the present invention is realized in a method for utilizing an intellectual structure for visualizing a system of multi-variate data points in a parallel coordinate system, identifying an area of interest within the system, and then transforming a selected portion of the system for visualization in single-point representations of n-dimensional points using broken-line parallel coordinates.

In a first aspect of the invention, the n point representations of conventional parallel coordinates are brought back into a single point representation that is the single point vector resultant of n dimensional spaces viewable in familiar three dimensional display space.

In a second aspect of the invention, coordinates are grouped in pairs, and the angle of inclination of the planes between the coordinate pairs in the presently preferred embodiment is chosen to be 180/n degrees, thereby resulting in evenly distributed planes.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given designations and in which the invention will be discussed so as to enable one skilled in the art to make and use the invention. It is to be understood that the following description is only exemplary of the principles of the present invention, and should not be viewed as narrowing the claims which follow.

The present invention has demonstrated that there are cognitive insights to be gained by reverse mapping data points displayed in a parallel coordinate system back into orthogonal spaces. Specifically, reverse mapping back into orthogonal space makes it possible to see multi-dimensional structures wherein a single point represents the last of the n dimensional vectors, rather than the n points generated in parallel coordinate representations.

The present invention is designed to generate Single-point representations of n-dimensional points using Broken-line Parallel coordinates to generate three dimensional surfaces (also referred to as the SBP technique). However, before delving into this SBP technique, it is useful to examine the overall process, beginning with a set of multi-variate data.

Consider data space that is defined by multi-variate data representing any kind of collective activity. The activity is to be referred to hereinafter as a system. Desirably, the behavior of interest for that system is characterized by one or more sets of data that has been collected in one or more experiments or observations of the system. These sets of data are typically organized, or are organizable, in spreadsheet format. In other words, the columns of a spreadsheet are considered the dimensions or coordinates, and the rows are considered the instances or sequentially indexed points or each coordinate. The values in each of the spreadsheet cells are the values of each indexed instance (row) or each coordinate (column). Furthermore, separate spreadsheets can be considered to be different but correlated sets of data space models.

The parent application, of which this application is a continuation thereof, describes visualization tools which build a digital model of such systems that can be viewed on a computer display, then animated and manipulated to thereby visually reveal relationships that might be discernible in that data space. The tools provide a geometrical understanding of the many kinds of waveforms that can appear in such data spaces. The present invention is then an extension of the first visualization tools. The present invention brings the n point representations of conventional parallel coordinates back into a single point representation that is the single point vector resultant of n dimensional spaces that are viewable in familiar three dimensional display space, as will be shown.

One of the initial purposes of developing the SBP technique was to develop a method for visualizing a single point in conventional three dimensional display space that was cumulatively and uniquely representative of n dimensions. Parallel coordinate representations of a system are excellent for understanding the influence of each coordinate by itself. However, the effect of the value of each coordinate on the other coordinates is impossible to understand from the parallel coordinate representation. For example, cumulative phase relationships between the coordinates are just not picked up or noticed by our minds. In contrast, orthogonal representations are uniquely powerful in showing these cumulative effects of the coordinate's values one upon the other. An important aspect of the SBP technique is therefore a process for visualizing these cumulative effects.

With this introduction to the SBP technique in mind, the process will be explained using illustrative examples. It is desirable to move data from the parallel coordinate system to a three dimensional coordinate system. A three dimensional visualization environment is preferable because the data is typically portrayed in a visually understandable manner. That is, the human mind is able to more readily comprehend the data. For example, looking at the $1^{st}$, $4^{th}$ and $5^{th}$ coordinates of a 5 dimensional sphere in parallel coordinates reveals none of the structure that is immediately recognizable when looking at these three coordinates in three dimensional orthogonal space. This concept will be demonstrated more fully in the illustrations to follow.

The basic SBP technique disclosed in this presently preferred embodiment is to rotate, break between points, and separate parallel coordinate axes, with the amount of separation being determined by the magnitude of each point, and the amount of rotation being determined by the number of such axes.

Figure 1:
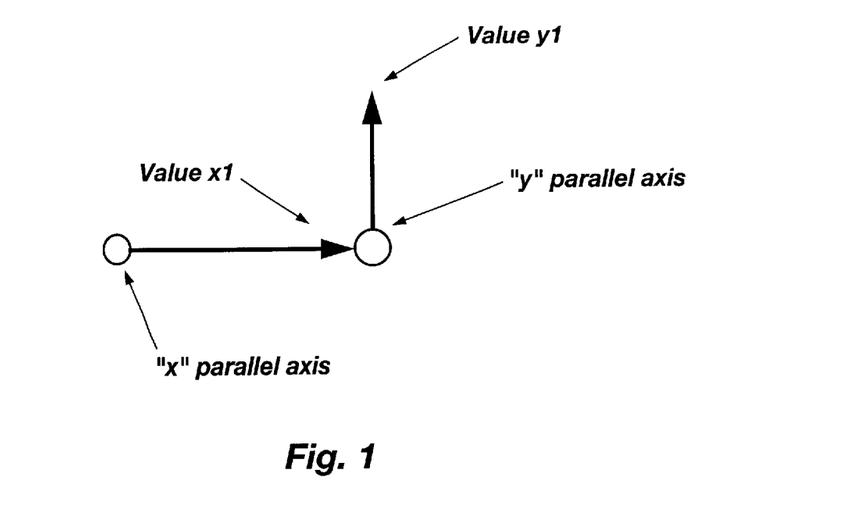
FIG. 1 is a graphical illustration in two dimensions that show a system which has parallel axes, where a second axis is positioned parallel to a first axis, but at a distance between them that is equal to the magnitude of the each point xi from the x axis.
Figure 2:
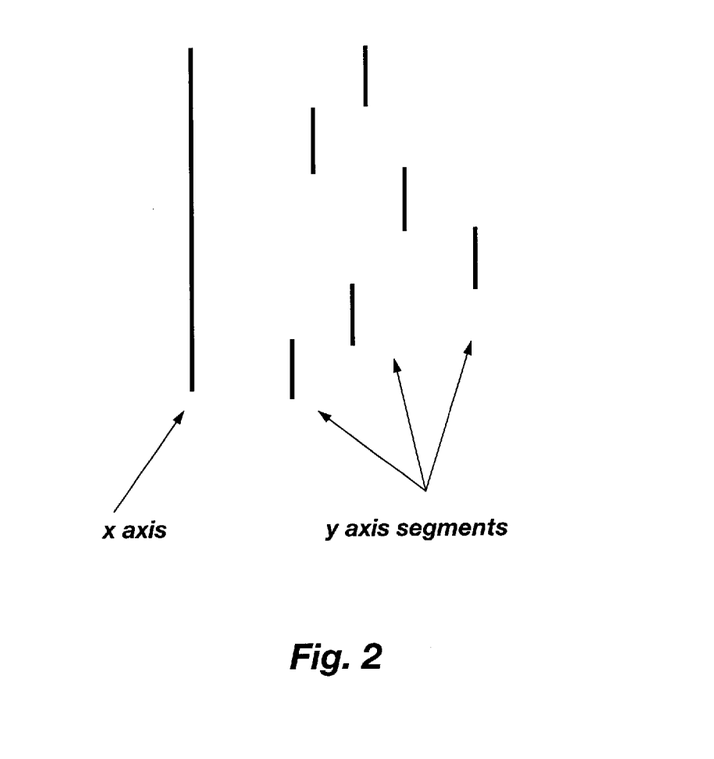
FIG. 2 is an illustration of the graph in FIG. 1 as seen from above, where the x and y axes are still parallel, and the y axis is broken into segments. In this figure, the graphing of six values (x1,y1; x2,y2; x3,y3; x4,y4; x5,y5; x6,y6) is implied.

FIG. 1 is an illustration in two dimensions that shows a system which has parallel axes. The first step in the SBP technique is to position a second axis parallel to a first axis, but at a distance between them that is equal to the magnitude of the first point x1 from the x axis. Then next step is to plot the value y1 perpendicular to the displacement x1. The process continues in this manner with each succeeding xi point. FIG. 2 is provided to illustrate this process with a view of 6 such points.

In summary, for each xi point, the process is to break and relocate an appropriate y axis segment at each of the xi successive points along the (unbroken) x axis, such that each yi segment starts at the end of each xi segment. The y axis is thus broken into segments, each (probably but not necessarily) located at a different distance from the x axis. All yi point segments are plotted perpendicular to the xi displacements, and all yi axis (broken) segments are parallel to the unbroken x axis.

Accordingly, the yi values are plotted perpendicular to the direction of the xi values, and the y axis is broken into a jagged line, each segment of which is perpendicular to the displacements xi. However, all segments of the broken y axis are parallel to the single line representation of the x axis. Together, the x axis and the y axis broken lines make a plane; looking down on this plane in FIG. 1, an observer would see the diagram shown in FIG. 2.

In FIG. 2, note that the x and y axes are parallel, even though the y axis is broken into segments. With an even number of n dimensions, pairs of axes can be associated in an orthogonal fashion such as is shown in FIG. 2. The inventors observed that one possible strategy is to then position these pairs (of orthogonal axes) in a consistent manner with respect to each other.

For example, consider two pairs of axes that are constructed as suggested above. In order to locate this pair of (two-parallel-axis constructs) orthogonally with respect to teach other, it is possible to do it in classical Cartesian fashion (perpendicular to the plane of x-y).

Figure 3:
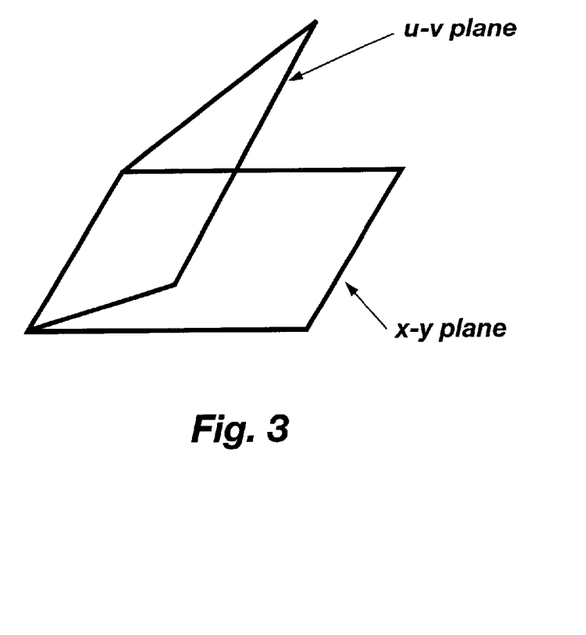
FIG. 3 is a graphical illustration of the plane of the second pair of axes (u,v) which is rotated at a 45 degree angle with respect to the x-y plane, while keeping the u-v axis pair parallel to the x-y axis.

FIG. 3 shows that alternatively, one can rotate the plane of the second pair of axes (u,v) at a 45 degree angle (or at any other desired angle) with respect to the x-y plane, while keeping the u-v axis pair parallel to the x-y axis. Accordingly, all points ui and vi can be plotted orthogonally with respect to each other on the u-v plane, and this plane is then orthogonal (but not at a 90 degree angle) to the plane x-y in the sense that the ui and vi points are independent of the xi and yi points. In this figure, these ui and vi directions and values are at 45 degrees with respect to the xi and yi, and not 90 degrees. It should also be apparent that the u axis and the v axis are parallel to the x axis and the y axis.

Next, in order to obtain a single end point for this four dimensional vector, it is necessary to determine the origin of each point ui. The single end point is to be on a broken line segment of the u axis originating at the end of each yi point and located in the 45 degree u-v plane. This means that the u-v plane in the diagram above is really a broken-plane, with each segment of that plane being parallel to the 45 degree plane shown in FIG. 3. In similar fashion to how the yi points were plotted on broken segments of the y axis in the original x-y plane, the vi points are now plotted in the 45 degree plane: the origin of each point vi will be at the end of the corresponding point ui, and directed perpendicular to the ui vector and perpendicular to the 45 degree u-v planelet as established for each ui value. In effect, this establishes a four dimensional, orthogonal arrangement with four independent axes all situated in parallel, but with three of the axes consisting of broken line segments oriented such that pairs of these axes are at 45 degrees with respect to each other.

The objective of the method described above is to obtain one final four dimensional point rather than the four points that are generated in conventional Inselberg or nDimensional (as disclosed in the parent case) parallel coordinate systems. This point is unique in the sense that it can be reached consistently by the trajectory indicated, but it is not unique in that other values of x, y, u, and v can be generated to also reach this same point, as in the classical perspective drawings.

Figure 4:
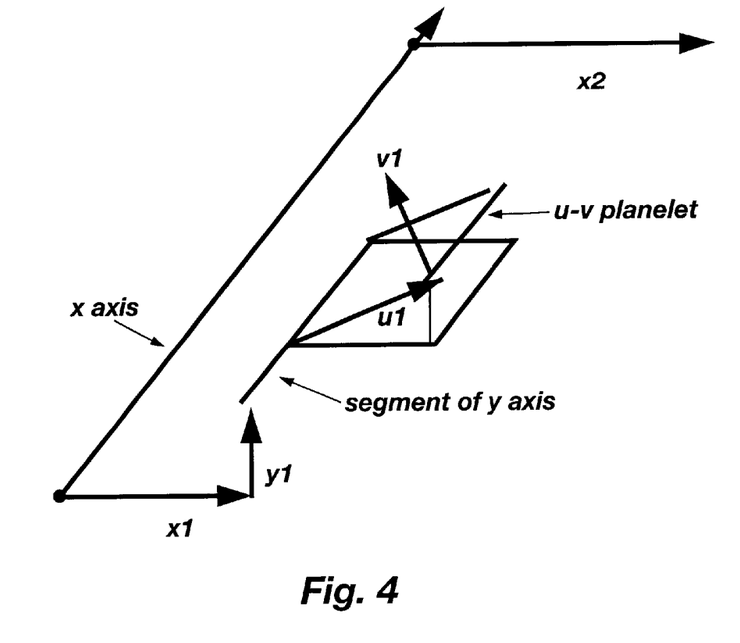
FIG. 4 is a graphical perspective illustration of SBP space which is used to display independent locations of four dimensions.

FIG. 4 is a further illustration of the concepts described above. This figure is of SBP space which shows structure that is used to display independent locations of four dimensions. It should be noted that what is called the x-axis is the parametric reference axis used in display space against which are plotted vertically the xi values. Similarly, the y axis is the parametric axis used graphically in display space along which are plotted the y values yi in display space. It is important to note that the display space distance Δ mentioned in the earlier descriptions of the specification refer to the separation between xi and x2 in FIG. 4 along this parametric reference axis x.

An important aspect of the present invention is that three dimensional SBP space is capable of displaying classical three dimensional objects extended by n dimensions. This process is an extension of the concept used for displaying independent orthogonal (but not 90 degree orthogonal) space to allow depiction of the first three coordinates as classical orthogonal objects with the next (n−3) dimensions displayed beyond but functionally connected to the first three classical dimensions.

Figure 5:
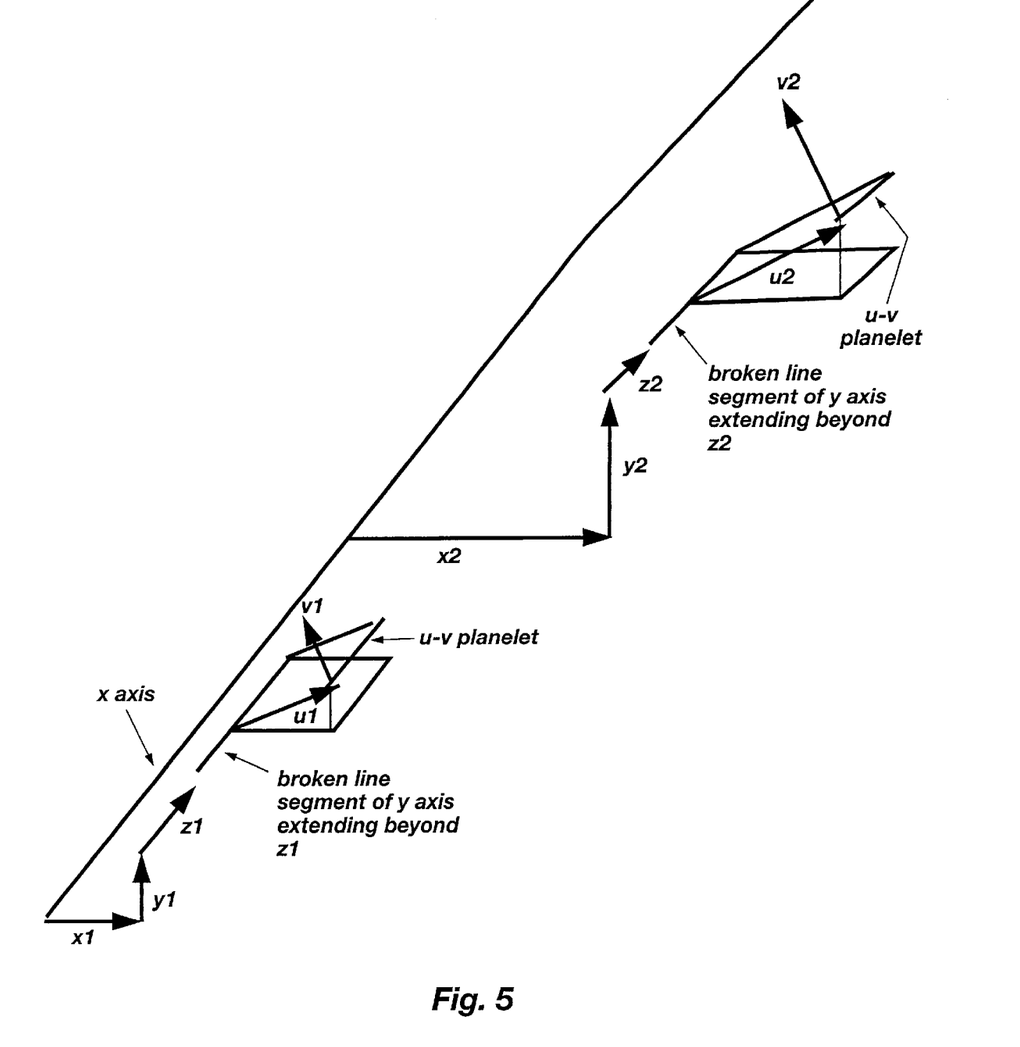
FIG. 5 is a graphical illustration of 3D SBP space showing the first three coordinates in 90 degree orthogonal relationship, with the next (n−3) coordinates shown in the SBP structure.

This extension process is as follows. First, each zi component is drawn in its classical 90 degree orthogonal position. The result is a classical three dimensional object, but done in this case using broken line parallel coordinates. However, in order to represent each of the subsequent (n−3) coordinates, they are drawn as described in FIG. 4. This process builds the vector of subsequent dimensional components on top of the original three orthogonal components, but draws them in this new SBP structure. This yields a classical perspective drawing as done by SBP for the (n−3) dimensions "on top" of the original three dimensional orthogonal structure. This completed structure, showing the first three coordinates in 90 degree orthogonal relationship, with the next (n−3) coordinates shown in the SBP structure, is depicted as shown in FIG. 5.

To generalize this process to n dimensions, the coordinates can be grouped in pairs, and the angle of inclination of the planes between the pairs in the presently preferred embodiment can be chosen to be 180/n degrees. For an odd number of coordinates, the last coordinate need have no corresponding y segment. Alternatively, each coordinate can be rotated to be at its own angle of 90/n degrees with respect to the plane of the preceding coordinate's plane.

The objective of the presently preferred embodiment of the invention is to obtain a set of m resultant single points (in the z direction of display space), one for each of the m (conceptual) single points in the original set of (n dimensional valued) single points in classical orthogonal space, but done using (broken-line) parallel coordinates. In this situation, it is possible to draw and see all m points, each being the single point resultant of the whole (m×n) dimensional entity. These final m points are then viewed in classical three dimensional orthogonal display space (see FIG. 16).

It is imperative to understand that this single SBP n-dimensional point is seen and viewed in conventional three dimensional display space. Additionally, the n vectors contributing to this single end point can also be seen and displayed (or not) in conventional three dimensional display space. Thus, in this SBP independent orthogonal parallel coordinate space, what is obtained is one unique end point for all of the n values in its data space. The set of these single end points can be seen and viewed (typically as surfaces, each at their unique angle in display space) in conjunction with the n vectors that contribute to their final location. It is this SBP generated surface that is different from the surfaces seen in the parallel coordinate visualizations of the parent case. However, it is also observed that this SBP generated surface also shares some geometric characteristics that are similar to the parent case.

The SBP representation generates viewable single points in classical three dimensional human perception display space of the n dimensional entities, which are the resultants of each n intervening vector. Most importantly, the conceptual power of these classical three dimensional orthogonal coordinate projections in SBP space lies in the end points representing the influence of each preceding point. Those projections at 90 degrees yield unique single end points, but perspective drawing projections at less than 90 degrees allow consistent and repeatable visualization of single n points for n dimensional entities. The SBP technique of spacing the pairs of vectors by broken pieces of the parallel coordinate y generates these SBP single end points.

Disadvantageously however, in classical three dimensional display space, an observer cannot see the end resultants of more than three coordinates' values. The SBP technique places the intervening coordinate values on planes at smaller angles so that any number of coordinates can be seen in three dimensional display space. And with its broken y axis segments and single end point for n coordinates' values, these SBP end points represent a single point that is the cumulative effect of each intervening coordinate. By placing pairs of coordinates at these smaller angles, one can select which coordinates to pair so that conventional orthogonality results can be seen in each of the paired-coordinate planes. And by placing these paired planes at consistent angles (with respect to each other), surfaces can be observed (in display space) showing the cumulative behavior across the data model for each of these coordinate pairs.

One result is that while the single n-dimensional point in broken parallel coordinate space (SBP space) is not a representation of classical orthogonal coordinates, it is a consistent point in three dimensional display space, and it generates shapes that are identical, for example, to the classically drawn four dimensional cube.

By building the first three coordinates orthogonally, it is possible to display all subsequent coordinates using the SBP technique superimposed on classical three dimensional geometric structures. This enables the display of the subsequent (n−3) coordinates on top of the original (classical) three dimensional orthogonal display, but synchronized with that geometry. These subsequent coordinates can be representative of forces, independent parameters such as charge or parity, or any other parameters of interest.

These subsequent dimensions can be shown in a manner which distinguishes them from other related parameters. For example, in an alternative embodiment, different colors are used to thereby differentiate their relationships from the first three physical space coordinates, or they can be observed individually, or their end resultant surface can be observed by itself.

As a summary, it is observed that possible correlations between structures (curve fit waveforms) seen in some parallel coordinate systems, or in the SBP representations, is illuminated quite differently when those coordinates are mapped back into orthogonal coordinates. This can be done by sets of any three parallel coordinates, taking three of them at a time back into three dimensional orthogonal space. In SBP models which themselves show n dimensional models in two dimensional (flat) space, mappings back into classical three dimensional space must also be done only three dimensions at a time, because that is all that can be conventionally modeled in visualizable orthogonal spaces.

For example, the correlational significance of sin/cos waves moving along in three parallel coordinates is dramatically conveyed by seeing those waveforms mapped back into three dimensional space. There, the waves appear as spheres. Such a spherical relationship is not at all evident when looking at just their phased parallel coordinate representation. Spherical relationships among many dimensions is, for example, directly visualizable in the SBP space models, but recognition of the meaning of different shapes seen in SBP space comes only via the experience gained through mapping geometric shapes back and forth from three dimensional space to SBP space.

Accordingly, the SBP method enables the scaling of data so that the entire data space model can be visualized at once. Alternatively, different colors can be assigned to appropriate parts of the display space models of data. It is also proposed that it is possible to insert zero valued coordinates or data values in order to generate visual reference relationships in display space models. It is also useful to be able to save display space models as they are oriented during experimental animations. Another useful technique is the superimpose several models of different but related data sets where these models can be superimposed directly on top of each other, offset vertically one above the other, or offset horizontally adjacent to each other and aligned for visualizations along or across the coordinates. It is also proposed that it is advantageous to embed known geometric structures in huge data sets for visualization and analysis, for example, from a distance. Finally, it is suggested that analysis techniques can be developed for determining shapes and relationships in huge data bases when examined from a distance.

As explained previously, SBP is a technique for displaying orthogonal representations of the cumulative effects of coordinates' values upon each other. Another motivation behind development of this technique was the desire to be able to make a movie wherein n dimensional entities can be intuitively seen as superimposed on real three dimension geometries. Such a movie can be used for scientific visualization purposes, for intellectual comprehension, for military or civilian command and control operations, or for entertainment purposes.

For example, the movie "The Picture of Dorian Gray" depicted what happened to a person's image (a painting) as he aged and as his character developed. With the technique of broken parallel coordinates (SBP), it is now possible to accomplish this fictional purpose mathematically. It would be necessary to provide the equations (dimensions) for the effects of age, emotion, character, attitude (motivation), etc. The SBP technique would make it possible to age Dorian Gray's sculpture, not just a picture.

Another application of the three dimensional SBP technique of the presently preferred embodiment is that of scientific visualization. In molecular chemistry, for example, atoms are physically located in a three dimensional arrangement as a consequence of many parameters such as physical forces, allowed valence bonds, etc. Each of these parameters is a dimension as used above, and since each parameter is mathematically described, the final three dimensional physical location can be mapped directly according to the mathematics describing each parameter (or dimension in this visualization sense). Similarly in astrophysics, particle or matter location is a function of many parameters, and so physical location can be mapped and seen as a direct visual resultant of the many dimensions involved.

It should also be realized, however, that it is also a consequence of the contortions employed to achieve the SBP representation that the result can also mask and distort the relationships among the many dimensions. SBP is a different mapping into m (n vector) point set surfaces that can be displayed and examined for structure and relationships among the n dimensions. It has been discovered that the orthogonality of pairs of dimensions can be particularly useful in certain circumstances. Likewise, the rotational symmetry among the pairs of dimensions can also generate particularly useful results in different circumstances.

In another alternative embodiment, reassignment of dimensions in different orderings might also prove useful as one studies these SBP surfaces to discover hidden or new relationships among the variables. Spreading the paired-vector planes at angles greater than the original orientation can facilitate viewing of these planes individually. Uniquely coloring these paired-vector planes also facilitates viewing them individually. Eliminating all but the paired-vector plane of interest can also be done to thereby improve the discernment of relationships within any paired-vector plane.

It was stated at the beginning of the SBP process that in the presently preferred embodiment, the steps comprised rotating, breaking between points, and separating parallel coordinate axes. It was also shown that the rotation was preferably equal between each dimension. However, an alternative embodiment envisions making non-uniform rotations of the planes in SBP space. The purpose is still to reveal structure, patterns and trends that in one or more pairs of dimensions can be seen as relevant.

Along with SBP space, it is an alternative aspect of the invention to visualize n Orthogonal Dimension (nOD) display space. The technique for being able to visualize proportional depth (real depth, not perspective depth) using the prior art technique of ChromaDepth is to encode the colors used on a computer monitor, or in a computer printer, in the natural (Newtonian) prism deflected spectral sequence of colors. To do this, the first step is to determine the mapping for the red, green, and blue (RGB) color sequences that correspond to the natural spectral sequence, and then use those RGB codes to assign colors to structures in the display space model such that those structures appear at the desired linear depths. This technique is to be referred to as Linearized-Color Depth (or L-DC) display space.

Use of the nDV method for n dimensional cubes exemplifies what n dimensional cubes actually look like in L-CD display space. L-CD display space consists of triplets of visually orthogonal dimensional models. Each triplet is displayed optically on a different zone of the display, or on different, separate, individual displays. These displays can be L-CD displays, or on a machine such as the EVANS & SUTHERLAND (TM) STAR RIDER (TM) display, or Muckerheide acoustic mechanical displays. An important requirement is that the display must be able to show realistic three dimensional relationships such that they show linear depth perceptions in addition to conventional two dimensional x and y relationships.

Accordingly, nOD displays consist of n sets of triplet displaying zones. For visual simplicity, these zones (or three dimensional display units) should be as close to each other as possible. One of the new aspect of the invention is the use of concatenated triplet displays, each showing the next three levels of orthogonal dimensions, to be thus able to generate meaningful, comprehendible, visual representations of n dimensions in 90 degree orthogonal relationship to each other.

The detailed descriptions above are explanations of SBP space and nOD space, and how to use visualizations thereof in conjunction with the nDV method which plots multivariate data in parallel coordinates and enables movement therethrough to identify structures, patterns and trends. It is helpful in this context to therefore examine actual constructs in display space.

In the presently preferred embodiment, a display space model is constructed with spreadsheet data. This model plots the parameters used to represent each aspect of behavior along one axis. Conceptually, it is useful to consider these parameters to be the columns in a spreadsheet. The model then plots the instances (or events) for each parameter along a second perpendicular axis. Conceptually, it is useful to consider these instances to be the rows in a spreadsheet. Finally, the model plots the values for each instance of each parameter as the height above the horizontal plane established by the first two axes. Conceptually, it is useful to consider these height values to be the values contained in each cell of the spreadsheet. This kind of model is often referred to as a "Manhattan" view of data. It shows what might be considered to be skyscrapers arranged around a rectangular grid of streets. The difference in the display space model of the present invention is that the "avenues" are considered to be dimensions, the "streets" are considered to be the rows or indexed value sets of the dimensions, and the heights are considered to be the values in each cell of the spreadsheet. This multi-dimensional perspective on what is being displayed is vital in the analysis process when discerning possible relationships, and when looking for structures in the modeled data spaces.

Understanding the mapping of geometric relationships back and forth between familiar three dimensional orthogonal space and three dimensional parallel coordinate space comes from familiarity with shapes in display space. With this familiarity, conventional waveshapes are then analyzed by conventional curve-fitting techniques for interpolation or extrapolation. These geometrical mappings allow intuitive generalizations to show how to interpret unit-dimensional behavior one parameter at a time, as multi-dimensional behavior in parallel coordinates. This mapping then enables grouping of parameters next to each other for mapping back into three dimensional orthogonal space. In other words, this understanding enables grouping of columnar data within a spreadsheet to thereby clarify a useful order in which to consider or place those columns.

In order to recognize important shapes and relationships from data displayed in parallel coordinates, it is helpful to know what simple geometric shapes from three dimensional orthogonal coordinates look like in parallel coordinates. For this knowledge, it is possible to generalize these shapes in three parallel coordinates to arbitrarily many parallel coordinates. It was also stated previously that experience is helpful when learning to recognize different shapes seen in SBP space. Typically, this experience is gained by mapping shapes back and forth between three dimensional space and SBP space, as will be demonstrated.

Figure 6:
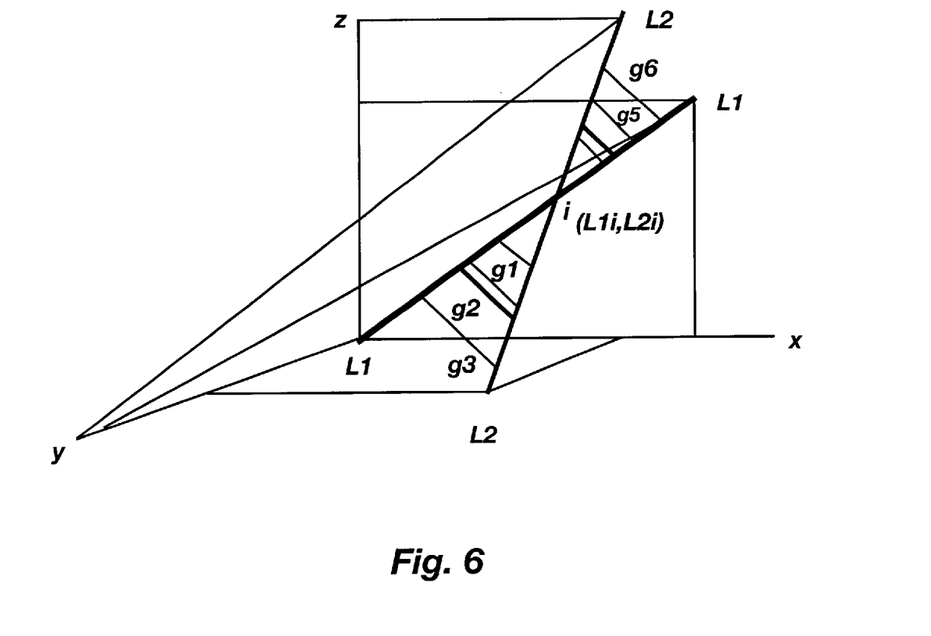
FIG. 6 is a classical view of two intersecting straight lines in three orthogonal coordinate space, and a plane defined by the intersecting lines.

FIG. 6 is an illustration of two intersecting straight lines. It is known that straight lines in orthogonal space map into straight lines in each of the coordinates of parallel coordinate space. Note that the two straight lines L1 and L2 intersect at point i, where the x, y and z coordinates of each straight line are all equal in value. Also note that the plane defined by these two intersecting lines is depicted here by the generatrix: lines $g_j$.

Figure 7:
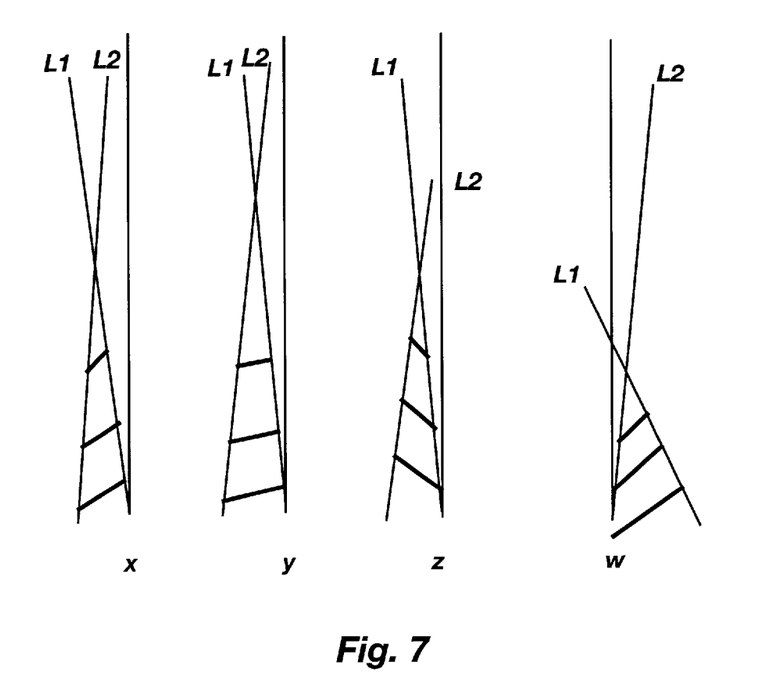
FIG. 7 is a classical view of the same two intersecting lines of FIG. 6, but now mapped to parallel coordinates.

FIG. 7 is the corresponding view of the straight intersecting lines of FIG. 6. Note that the heavy lines are the individual coordinate projections of each of the generatrix lines $g_j$ shown below the intersection in the orthogonal views. The upper generatrix lines are not shown here for the simplicity of viewing this structure. Thus, in parallel coordinates, a plane appears as planelets in each of the multiple coordinates for which that plane is defined to exist.

It should also be observed that these intersecting lines (for each individual axis) are in the display plane normal to the (x, y, z, w . . . ) plane containing these coordinate axes.

Figure 8:
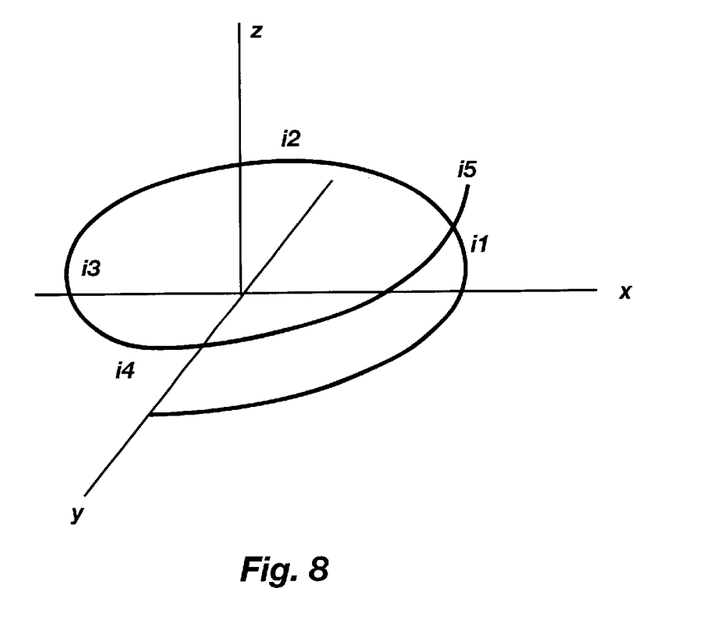
FIG. 8 is a classical view of in three orthogonal coordinates of a cylinder approximated by a helix of pitch p.

FIG. 8 is a classical view of in three orthogonal coordinates of a cylinder approximated by a helix of pitch p. The helix intersects the x-z plane first at i1, then it intersects the x-y plane at i2, next it intersects the xz plane at i3, then the yz plane at i4, and finally the x-z plane at i5.

Figure 9:
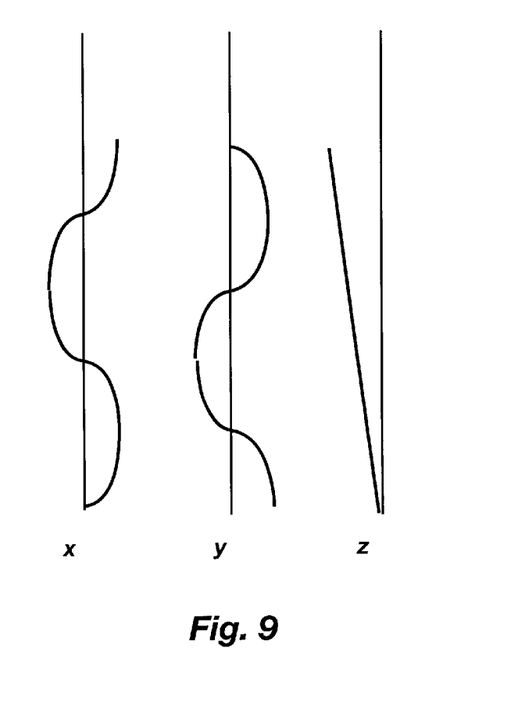
FIG. 9 is a classical view of the helix of FIG. 8, but now mapped to parallel coordinates.

FIG. 9 is a classical view of the helix of FIG. 8 in three parallel dimensions. The x and y projections of the helix in orthogonal coordinates are the sin/cos waves shown here in these two parallel coordinates. This assumes that the helix in the three dimensional coordinates is a circle in the x-y plane. Therefore, in three parallel coordinates, the value of z increases linearly (with slope p) as the helix progresses. This assumes that the helix in three orthogonal dimensions is linear in z. The parametric equations for this cylindrical helix are:

$x = R \cos \theta$      Equation 1

$y = R \sin \theta$      Equation 2

$z = n\theta$      Equation 3

A cylindrical surface is generated for continuous values of n, and a cylindrical helix is generated for integer values of n.

A cone can be represented by a three dimensional helix, again of controlled pitch in the z direction, with the diameter of the sin/cos waves x and y varying uniformly from zero with respect to z, to thereby generate a cone shaped helix, as opposed to a cylindrical shape as in FIG. 8.

Helical conical sections are therefore the classic intersections of a plane with this helical cone. Drawings of such intersections are again easier to make, and to extrapolate in parallel coordinates than in orthogonal coordinates. Generalizations of these (helical approximations) to many parallel coordinates are again made by repeating the sin/cos waveforms, keeping the z orientation of the cone. Correctness of these multidimensional generalizations needs to be checked by mapping the inferred parallel coordinate structures back into orthogonal space, three dimensions at a time.

In application to visualizations of data, one method of effectively using these understandings of simple geometry in parallel coordinates is to use the nDV method of showing "in-line" spreadsheet images of each spreadsheet's data space aligned one above the other. This gives n surfaces for n spreadsheets, each surface spaced a display distance d above the surrounding data surfaces. Examined visually in this matter, it is possible to reach an opinion about which major structures may be relevant for further analysis.

A similar technique in display space would be to superimpose a set of n spreadsheets instances of a given data space study, superimposing each data surface directly on top of the other n instances. Using a different color for each instance would help visually clarify the differences between each of the n instances of a given data space study. This technique of superposition of data surfaces is a powerfully intuitive way to see what is different about each instance.

In order to understand how a sphere can appear in parallel coordinates, it is necessary to determine the parametric equation for a spherical helix. The parametric equations for a sphere of radius $\rho$ and centered at the origin are $x = \rho \sin \theta \sin n\theta$      Equation 4

$y = \rho \sin \theta \cos n\theta$      Equation 5

$z = \rho \cos \theta$      Equation 6

The parameter $\theta$ is not related to any of spherical coordinate angles in three dimensional orthogonal space. The parameter θ is the graphing parameter used to separate the plots of each instance of each coordinate by the display space (artifact) incremental value Δ along their respective reference axes (unit-dimensional axes) in display space.

In parallel coordinates, these parametric expressions for spherical relationships among three coordinates will look similar to those show in FIG. 9. A sphere of radius R is approximated with a helix of frequency θ and amplitude R varying sinusoidally with nθ in x and co-sinusoidally with nθ in y. Therefore, in parallel coordinate data space, any set of two individual coordinates having values that vary as sin θ cos nθ with a third coordinate varying as cos θ can be associated together and interpreted as a spherical helix in three dimensional orthogonal dimensional space.

The process above can be generalized to n dimensional spheres. Using R as the radius of the n dimensional sphere, and the notation of $D^n$ to represent the nth dimension, the n dimensional parametric representations of a sphere are:

$D^1 = R \cos \theta$     Equation 7

$D^2 = R \sin \theta \cos k\theta$     Equation 8

$D^3 = R \sin \theta \sin k\theta \cos j\theta$     Equation 9

$D^4 = R \sin \theta \sin k\theta \sin j\theta \cos i\theta$     Equation 10

$D^5 = R \sin \theta \sin k\theta \sin j\theta \sin i\theta \cos m\theta$     Equation 11

$D^{n-1} = R \sin \theta \sin k\theta \sin j\theta \sin l\theta \sin m\theta \ldots \cos(n-1)\theta$     Equation 12

$D^n = R \sin \theta \sin k\theta \sin j\theta \sin l\theta \sin m\theta \ldots \sin(n-1)\theta$     Equation 13 where n is the number of dimensions. It should be noted that only the last two equations of the set have the same number of factors, (n−1) in quantity, and that they always end with a pair consisting of a cos term and a sin term. These equations (with appropriate substitutions) satisfy the expressions for a sphere in n Cartesian coordinates:

$R^2 = (D^1)^2 + (D^2)^2 + (D^3)^2 + \ldots + (D^n)^2$     Equation 14

Therefore, when considering if an interpolated (curve-fit) structure in any set of n coordinates (n columns in a spreadsheet) might be curve fitted to an n dimensional sphere, it is preferred that the curve fitting mathematics be capable of determining the approximation, where a product of sin/cos functions might appropriately describe the waveshape represented by the data.

Spherical relationships in three dimensions are expressed by the product of two sin/cos functions. Such a relationship might be visually determined to exist among three coordinates (columns in a spreadsheet) that are not necessarily adjacent to each other. And spherical relationships among several coordinates that are not adjacent to each other in the spreadsheet might exist and be visually discernable by recognizing the characteristic shapes of these multiple sin/cos products waveforms.

It is noted that when generalizing any structure from its three dimensional views to its n dimensional views in parallel coordinates, any of several methods can be applied by the user. Only when there is an algebraic definition (such as there is for an n dimensional sphere) does the generalization to n dimensions have to be constrained to fit that algebraic definition for n dimensional objects. This situation applies to the n dimensional sphere described in Equation 14.

Surfaces and solids in parallel coordinates are useful to recognize when utilizing the present invention. Polyhedra are typically depicted as a series of intersecting plane surfaces. Recognizing a plane surface in parallel coordinates is a basic capability. For example, defining a plane by two intersecting straight lines can be used to define the surfaces of a cube.

Figure 10:
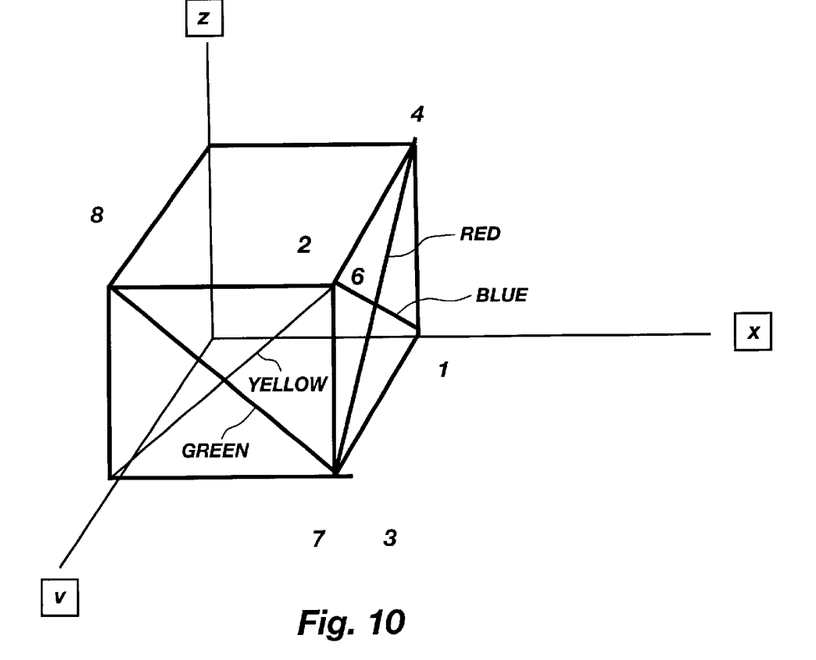
FIG. 10 is a graphical illustration showing a cube in three dimensional orthogonal coordinates, with red and blue lines defining one side of the cube, and green and yellow lines defining another side.

FIG. 10 is provided to show a cube in three dimensional orthogonal coordinates. The end "box" or square plane segment is defined by the two (red and blue) intersecting straight lines.

Figure 11:
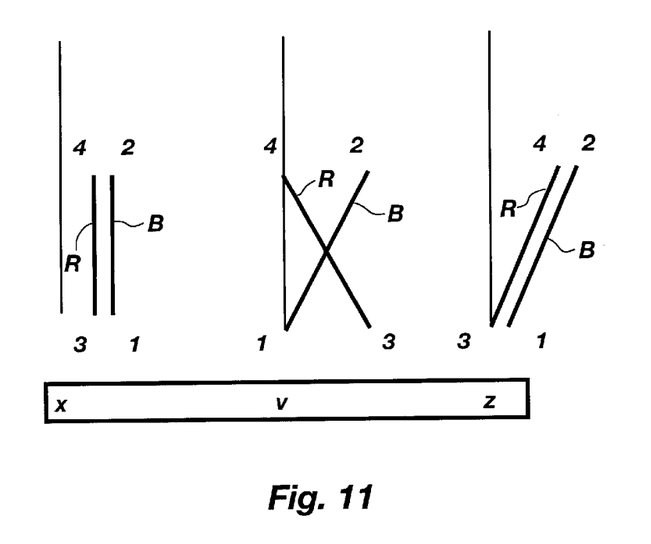
FIG. 11 is a mapping of the red and blue lines in parallel coordinates.

For comparison purposes, FIG. 11 is an illustration of the red and blue lines of FIG. 10, but shown in parallel coordinates. In defining the projections of these colored lines onto the coordinate axes, it is useful to establish a sequencing convention for deciding which is point 1, point 2, etc. The preferred sequence is to start at the origin of FIG. 10 and count outward for each axis in turn, and then number the end points in this sequence. This produces the projections shown in red and blue in FIG. 11.

The reason for showing the red line and the blue line segment adjacent to each other is that it is necessary to show that two lines exist in the same place and have the same orientation. In other words, the x projection of the red line from three dimensional space would occupy the same points as the blue line. Strictly speaking, these lines could also be superimposed over each other, but this would generally not yield a meaningful image.

Similarly for the z projection of the red and blue line components, a pair of lines separated slightly is a convenient way to show the two distinct lines that otherwise fall on top of each other.

It is observed that if the polygon of FIG. 10 were a rectangle instead of a square, the red and blue lines will be of different lengths.

Figure 12:
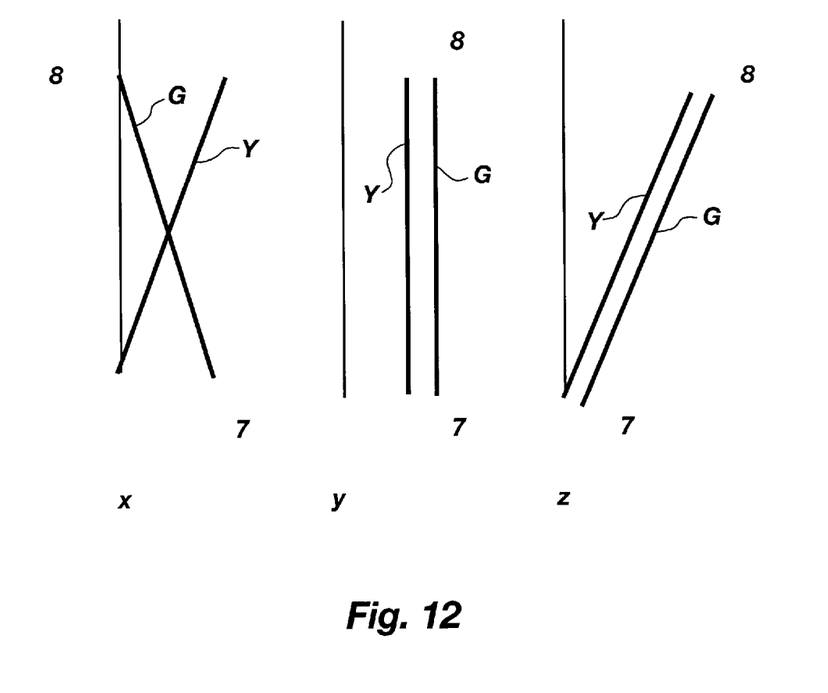
FIG. 12 is a mapping of the green and yellow lines in parallel coordinates.

FIG. 12 is generated in parallel coordinates by following the sequencing pattern of FIGS. 10 and 11. The resulting figure shows the green and yellow lines which define the second face of the cube. It should now be apparent that it requires six sets of three line sets in parallel coordinates to define the six plane surface segments that make up the six square faces of the cube of FIG. 10.

Figure 13:
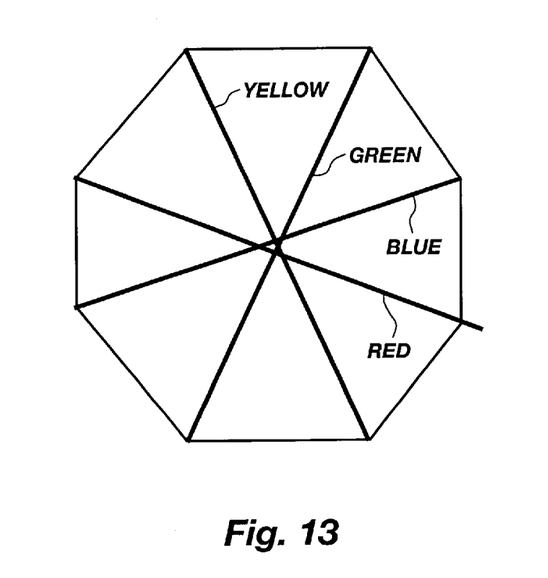
FIG. 13 is a graphical illustration showing a hexagon defined by four straight lines forming a plane.

FIG. 13 is an illustration of a hexagon which is defined by four straight lines in a plane.

Figure 14:
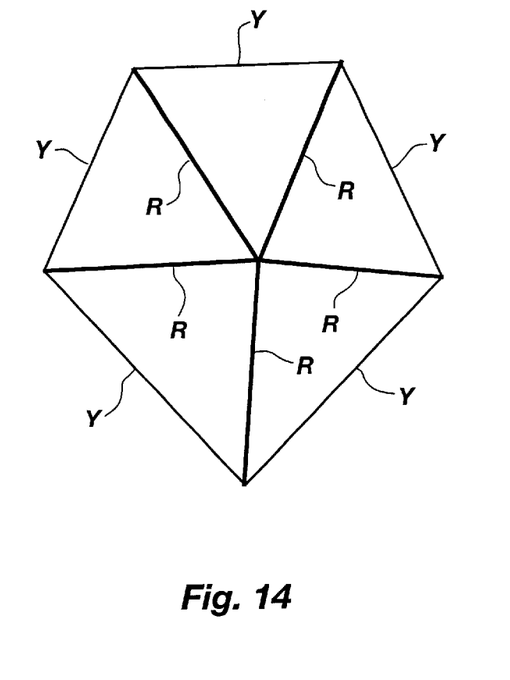
FIG. 14 is a graphical illustration of a polyhedron.

FIG. 14 is an illustration of a polyhedra. A preferred method of considering polyhedra is as a set of radii emanating from the origin of three dimensional space, with each radius having as its end a plane polygon (or planelet) defined by a straight line set such as a rectangle or hexagon. Odd numbers of sides in a polygon planelet defined by straight lines can therefore be drawn as shown in FIG. 14.

Figure 15:
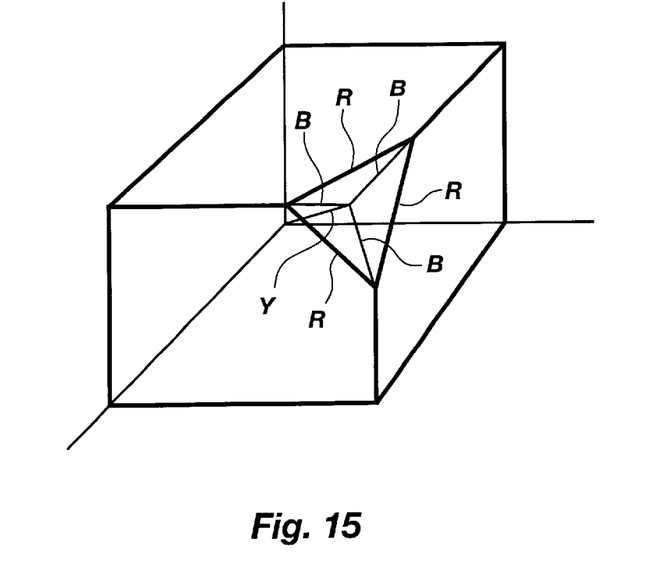
FIG. 15 is a graphical illustration of a polyhedron which is defined as a function of a corner of a cube.

FIG. 15 is provided as another way to visualize polyhedra. Defining a polyhedron in this fashion is accomplished by considering that the (red edged) polygon planelet (defined by the blue lines) is attached to the end of the (yellow) radial vector emanating from the origin of the three dimensional display as shown in FIG. 15.

To represent this polyhedron of FIG. 15 in parallel coordinates, the simplest technique is to consider the yellow radial vector coming out from the origin as a "coordinate," such as the fourth coordinate. The triangular red planelet (facet) is represented in parallel coordinates (where the orthogonality of the several coordinates may be unknown; in data spaces such as spreadsheets data, the columns of the spreadsheet represent "coordinates" who's orthogonality is unknown) as in FIG. 11, with the three blue lines of FIG. 15 defining the red triangle.

Figure 16:
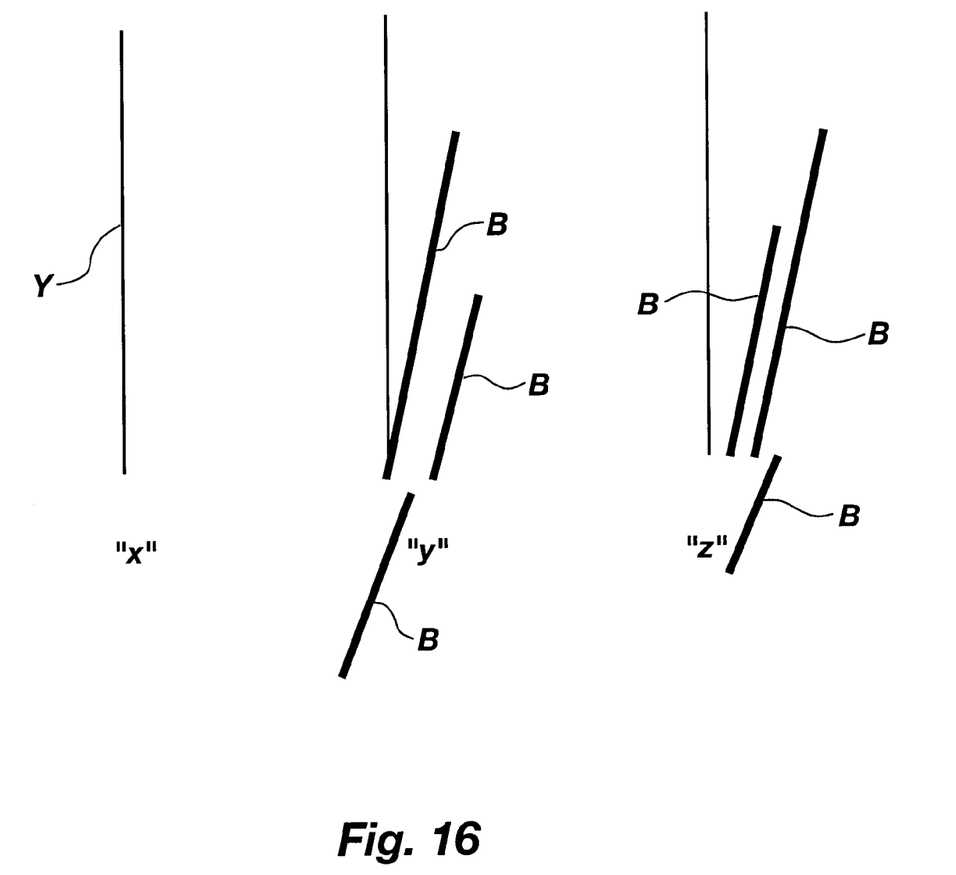
FIG. 16 is a graphical illustration of a polyhedron which is now mapped to parallel coordinates.

FIG. 16 is a parallel coordinate system of the data in FIG. 15. In this figure, x represents the yellow, radial "coordinate"

of FIG. 15, and y and z represent the projections of the blue triangular lines onto fifth and sixth coordinates that lie perpendicular to the yellow coordinate, and perpendicular to each other (like y and z in normal three dimensional orthogonal coordinates).

These $4^{th}$, $5^{th}$, and $6^{th}$ coordinates in parallel space representations do not have to have any orthogonal relationship to the $1^{st}$, $2^{nd}$, and $3^{rd}$ coordinates. These extra coordinates can be defined as desired, as they have been in FIG. 16, for use in FIG. 15. Thus, while the cube (FIGS. 10 and 11) and the red facet (FIGS. 15 and 16) are defined, the corner of the cube that is shown as removed in FIG. 15 has not yet been deleted. Therefore, for the purpose of seeing classical geometric shapes of polyhedra in parallel coordinates, it would be desirable to have a simple way of showing the deleted (black) sections of the cube that lie beyond the blue/red triangle facet.

Figure 17:
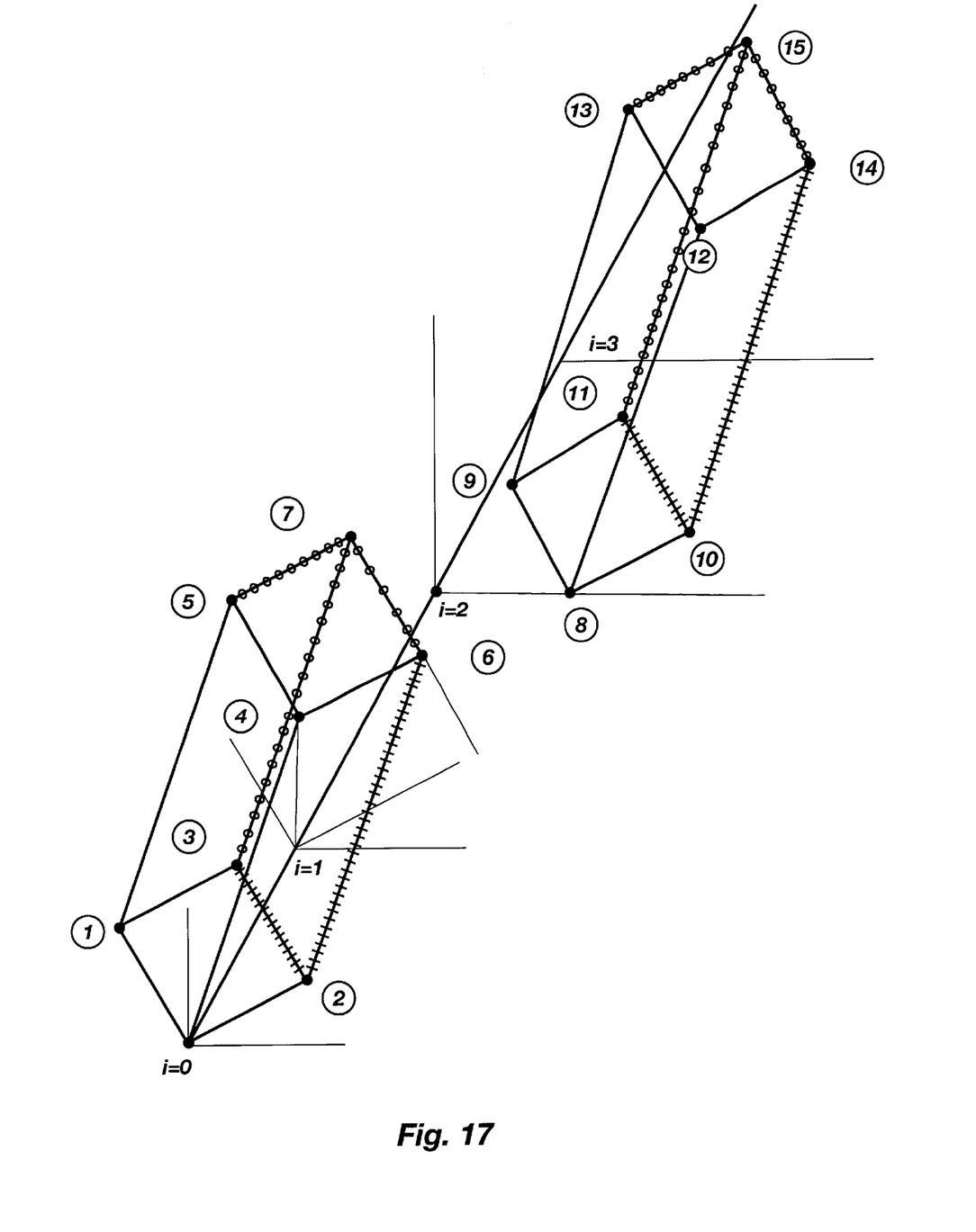
FIG. 17 is a graphical illustration of a four dimensional cube shown in SBP space.

FIG. 17 is an illustration of an object which is drawn in SBP space. Specifically, a four dimensional cube is illustrated. It is observed that a four dimensional cube consists of 16 unique vertices, and 32 edges. In this SBP representation, lines are shown connecting vertices 0 through 15. Alternatively, the figure could just have shown 32 end points. The figure also shows the difference between the green perspective angle and the SBP fixed angles per pair of perpendicular coordinates.

It is noted that this technique of using additional angles for each successive perspective dimension representation is used to represent many pairs of orthogonal dimensions in what has been defined as SBP space. Perhaps it is now more apparent that the purpose of SBP space is to generate a single resultant point from the n points created by parallel coordinate representations. Furthermore, the reason for wanting a single resultant point is that in parallel coordinates, it is relatively impossible to perceive the phase or functional relationships among the many parallel or concurrent coordinates.

As has been shown, classical orthogonal representations of data space hypothesize a single resultant point in n orthogonal dimensions, but this single resultant point has not previously been capable of being drawn on two dimensional surfaces, such as paper. Parallel coordinate representations generate n distinct points that correspond to this one conceptual end point in n orthogonal space. SBP space generates one end resultant point in broken-line parallel-coordinate space. As is shown in FIG. 16, the SBP technique also utilizes what can be considered to be several different perspective angles, one for each pair of dimensions drawn at 90 degrees with respect to each other.

In a last alternative embodiment of the present invention, it is envisioned that the data being displayed in parallel coordinates, SBP space or classic orthogonal space can be heard as well as seen. In other words, it is possible to hear the data as separately driven channels of a sound system. It is only necessary to define the parameters of a channel, and data which might not present any visual clues as to patterns, might present audible clues.

For example, suppose six channels of a sound system are assigned to six parallel axes of a parallel coordinate system. Frequency, amplitude or other characteristics of sound can be made to be functions of the data which is graphed thereon. It is then possible to "play" the data as opposed to seeing it. Alternatively, the data can be played while watching it. The data can even be repeated continuously in a loop to bring out features that are not particularly noticeable upon hearing once. Therefore, it is also envisioned that portions of the graphical data can be focused on and selected specifically for playback.

An example of making the data audible is to use frequency as a value. The audible range of frequencies are divided in a range of numbers or values that are covered. In other words, the values are scaled to match the audible range.

Alternatively, a first dimension is selected as frequency. Then, a second dimension is audible amplitude. A third dimension is voice. For example, linear and unique sequences of overtones are selected to represent different qualities of the basic amplitudes and frequencies used as the first two dimensions. Accordingly, it is possible to hear three orthogonal dimensions over a single sound channel.

One consequence of this invention is the stacking of three dimensional triplets in adjacent screens of a computer display. Therefore, it is also possible to stack adjacent channels when making the data audible. The result is depth in, for example, 9 orthogonal and viewable dimensions by using three adjacent screens, or 9 orthogonal and hearable dimensions with 3 concurrent sound channels. The important observation to make from the explanation given above is to recognize that it is possible to obtain a varied mix of visual and audible transformations of the data in order to recognize patterns and trends buried within.

In order to provide a complete and enabling disclosure, several appendices are provided which fully illustrate the concepts discussed herein. Appendix A is a read-me primer for operating the visualization software. Appendix B is an Open GL program listing for model construction. Appendix C is is a program listing of the SBP builder. Appendix D is a listing of parametric equations which generate directrix-defining diagonals for one dimensional, two dimensional, three dimensional, and four dimensional cubes. Finally, Appendix E is FIG. 17 with the addition of comments regarding edges.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for visualizing relationships between a plurality of n parallel coordinates which are plotted in a parallel coordinate system, by transforming the plurality of n parallel coordinates, and then generating a plurality of independent dimensions which are then plotted in a perspective view, said method comprising the steps of:

(1) selecting a pair of independent coordinates from the parallel coordinate system;

(2) transforming the pair of independent coordinates by generating a single resultant point representation of the pair of independent coordinates;

(3) mapping the single resultant point to a perspective view; and (4) repeating steps (1) through (3) for at least two more pairs of independent coordinates and corresponding resultant points, wherein the at least two more pairs of independent coordinates are selected from the parallel coordinate system, and wherein the mapping results in obtaining the perspective view which displays relationships between the pairs of independent coordinates that are not visible from viewing the independent coordinates in the parallel coordinate system.

2. The method as defined in claim 1 wherein the step of mapping the single resultant point further comprises the step of plotting each subsequent single resultant point as a function of each previous single resultant point plotted.

3. The method as defined in claim 1 wherein the method further comprises the step of mapping the single resultant points back into orthogonal space, where orthogonal is characterized as not having to be 90 degrees.

4. The method as defined in claim 1 wherein the method further comprises the steps of:
   (1) mapping the single resultant point in a first plane;
   (2) rotating a certain distance along a common axis; and
   (3) mapping the corresponding resultant points of each of the at least two more pairs of independent coordinates in a different plane, wherein each of the resulting different planes share the common axis.

5. The method as defined in claim 4 wherein the step of rotating a certain distance along the common axis further comprises the step of rotating a distance as a function of a total number of the pairs of independent coordinates being mapped.

6. The method as defined in claim 5 wherein the step of rotating a distance as a function of the total number of the pairs of independent coordinates further comprises the step of rotating a non-uniform distance between each rotation.

7. The method as defined in claim 4 wherein the step of mapping the resultant points comprises the step of separating each of the resulting points as a function of the magnitude thereof.

8. The method as defined in claim 1 wherein the method further comprises the steps of:
   (1) mapping a first axis x;
   (2) mapping a second axis y which is parallel to the first axis, and separated from the first axis a distance which is equal to a magnitude of a first point x1 from the first axis;
   (3) mapping a second point y1 perpendicular to a displacement x1; and
   (4) breaking and then relocating each new y axis segment so as to begin at each subsequent xi point along the first axis x, such that each yi segment begins at an end of each xi segment, thereby obtaining the second axis y which is broken into a plurality of segments, each of which is located at a distance from the first axis x which is equal to a magnitude of a corresponding point xi.

9. The method as defined in claim 8 wherein the steps of breaking and then relocating further comprise the step of mapping each of the yi segments perpendicular to a direction of each corresponding xi value, where the second axis y is thereby broken into separate segments which are all parallel to the first axis x.

10. The method as defined in claim 9 wherein the method further comprises the steps of:
    (1) forming a plane from the first axis x and the second axis y;
    (2) rotating around the first axis x a distance which is equal in degrees to 180 divided by a total number of resultant points being mapped;
    (3) forming a second plane which is defined by the first axis x and a new axis, wherein a second resultant point is mapped in the second plane; and
    (4) repeating steps (2) and (3) until all of the resultant points are plotted in a unique plane.

11. The method as defined in claim 10 wherein the method further comprises the steps of:
    (1) assigning the first axis x to be a parametric reference axis used in the perspective view, and against which are vertically plotted the xi values; and
    (2) assigning the second axis y to be a parametric reference axis used in the perspective view, and against which are plotted the values yi.

12. The method as defined in claim 1 wherein the method further comprises the step of only plotting a point xi but not a corresponding segment yi if there are an odd number of parallel coordinates to be plotted.

13. The method as defined in claim 1 wherein the method further comprises the steps of:
    (1) obtaining a set of m resultant points, each of which represents the last n dimensional vectors of each dimension, where the set of m resultant points is in a z direction of display space; and
    (2) viewing the set of m resultant points in orthogonal space.

14. The method as defined in claim 1 wherein the method further comprises the step of determining if a phase relationship exists between the parallel coordinates.

15. The method as defined in claim 1 wherein the method further comprises the step of determining if a functional relationship exists between the parallel coordinates.

16. A system for creating an intellectual structure within a computer memory, such that the intellectual structure can be observed and manipulated to thereby recognize and observe characteristics and attributes thereof, said system comprising:
    a means for generating a three dimensional visualization environment within the computer memory;
    a means for modeling a spatial non-orthogonal data space coordinate system within the three dimensional visualization environment;
    a means for generating the intellectual structure so as to be associated with the spatial non-orthogonal data space coordinate system of the three dimensional visualization environment;
    a means for providing a point of observation into the three dimensional visualization environment;
    a means for selecting a plurality of independent dimensions; and
    a means for plotting the plurality of independent dimensions in an orthogonal view to reveal new structures not visible in the spatial non-orthogonal data space coordinate system.

17. The system for creating an intellectual structure as defined in claim 16 wherein the means for generating a three dimensional visualization environment within the computer memory further comprises a graphical software program being executed on a general purpose computer.

18. The system for creating an intellectual structure as defined in claim 17 wherein the system further comprises a computer display associated with the computer memory to thereby enable the point of observation to be viewable thereon.

* * * * *